United States Patent [19]
Enami et al.

[11] Patent Number: 5,969,023
[45] Date of Patent: Oct. 19, 1999

[54] CURABLE SILICONE COMPOSITION

[75] Inventors: Hiroji Enami; Yuji Hamada; Takeaki Saiki, all of Chiba Prefecture, Japan

[73] Assignee: Dow Corning Toray Silicone Co., Ltd., Tokyo, Japan

[21] Appl. No.: 09/035,281

[22] Filed: Mar. 5, 1998

[30] Foreign Application Priority Data

Mar. 6, 1997 [JP] Japan ..................................... 9-069123

[51] Int. Cl.$^6$ .................................................. C08G 77/08
[52] U.S. Cl. .......................... 524/252; 524/493; 524/714; 524/847; 524/862; 524/588; 525/478; 528/15
[58] Field of Search ..................... 524/493, 252, 524/714, 847, 862, 588; 525/478; 528/15

[56] References Cited

U.S. PATENT DOCUMENTS

| | | | |
|---|---|---|---|
| 4,374,867 | 2/1983 | Nahory et al. | 427/38 |
| 4,584,361 | 4/1986 | Janik et al. | 528/15 |
| 4,791,186 | 12/1988 | Janik et al. | 528/15 |
| 4,801,642 | 1/1989 | Janik et al. | 524/714 |
| 5,332,795 | 7/1994 | Fujiki et al. | 528/15 |
| 5,334,687 | 8/1994 | Ikeno | 528/15 |
| 5,371,162 | 12/1994 | Konings et al. | 528/15 |
| 5,494,750 | 2/1996 | Fujioka et al. | 428/402.21 |
| 5,536,803 | 7/1996 | Fujiki et al. | 528/15 |

FOREIGN PATENT DOCUMENTS

| | | |
|---|---|---|
| 48-017847 | of 1973 | Japan . |
| 5-209127 | of 1993 | Japan . |
| 6-016937 | of 1994 | Japan . |

*Primary Examiner*—Margaret G. Moore
*Attorney, Agent, or Firm*—Catherine U. Brown; Timothy J. Troy; James E. Bittell

[57] ABSTRACT

A curable silicone composition cures to form a silicone cured product with improved fire-retarding properties. The composition comprises a hydrosilylation-reaction curable silicone composition Fire-retarding properties are imparted to the composition using a silica powder with a specific surface area of not less than 50 sq. m/g and a diamine compound. The cured product is preferably a silicone gel.

14 Claims, No Drawings

CURABLE SILICONE COMPOSITION

FIELD OF THE INVENTION

This invention relates to a curable silicone composition. More specifically, this invention relates to a curable silicone composition that forms a silicone cured product of superior flame resistance.

BACKGROUND OF THE INVENTION

Curable silicone compositions are used as sealants, fillers, or coatings for electric or electronic parts. On curing, they form silicone gels, silicone rubbers, or silicone resins of superior electrical characteristics, heat resistance, weatherability, and the like. For example, Japanese Patent Number JP-C-48-017847 discloses a curable silicone composition comprising a diorganopolysiloxane with silicon bonded vinyl groups at the molecular chain terminals and in the side chains, a diorganopolysiloxane having silicon-bonded hydrogen atoms at the molecular chain terminals or in the side chains of the molecular chain, or both, and a platinum-based catalyst.

U.S. Pat. No. 4,374,867 to Brown, et al. discloses a curable silicone composition comprising a branched dimethylpolysiloxane having silicon-bonded vinyl groups at the terminal ends of the molecular chain, an organopolysiloxane having silicon-bonded hydrogen atoms, and a platinum-based catalyst.

Japanese Patent Application Number JP-A-05-209127 discloses a curable silicone composition comprising a diorganopolysiloxane having two or more silicon-bonded alkenyl groups in each molecule, with a cyclic diorganosiloxane content of not more than 0.5 wt %, an organopolysiloxane resin having silicon-bonded alkenyl groups, a diorganopolysiloxane having silicon-bonded hydrogen atoms at both terminal ends of the molecular chain, and a platinum-based catalyst.

Diamine compounds have been suggested for improving the storage stability of such curable silicone compositions in U.S. Pat. Nos. 4,801,642 and 4,791,186 to Buentello et al., U.S. Pat. No. 5,334,687 to Ikeno, and U.S. Pat. No. 4,584,361 to Janik et al.

However, when these curable silicone compositions were cured, the cured products had insufficient flame resistance. This problem was particularly conspicuous in silicone gels. For this reason, it was impossible to seal or fill electric or electronic parts exposed to elevated temperatures over an extended period of time using these curable silicone compositions, especially silicone gel compositions.

Various inorganic flame resistance-imparting agents have been compounded with curable silicone compositions to improve flame resistance. For example, Japanese Patent Number JP-C-61-069865 discloses a curable silicone composition comprising an organopolysiloxane having two or more silicon-bonded alkenyl groups in each molecule, an organopolysiloxane having two or more silicon-bonded hydrogen atoms in each molecule, a reinforcing silica powder, an aluminum hydroxide powder, a clayey mineral powder, a triazole compound, and a platinum-based catalyst.

Japanese Patent Number JP-C-06-016937 discloses a curable silicone composition comprising an organopolysiloxane having, on the average, 0.1 to about 2.0 silicon-bonded vinyl groups in each molecule; an organopolysiloxane having, on the average, more than two silicon-bonded hydrogen atoms in each molecule; an inorganic filler selected from the group consisting of ground quartz, metallic carbonate, and carbon black; and a platinum-based catalyst.

However, sufficient flame resistance could not be obtained without compounding large quantities of inorganic flame resistance-imparting agents in these curable silicone compositions. As a result, the curable silicone compositions had insufficient flowability and handling properties, the external appearance of the resultant silicone cured products was non-transparent and was limited to white, black, or gray colors. Furthermore, when curable silicone compositions containing the inorganic flame resistance-imparting agents are stored, the flame retardants can precipitate.

The object of the present invention is to produce a curable silicone composition that forms a silicone cured product with superior flame resistance.

SUMMARY OF THE INVENTION

This invention pertains to a curable silicone composition comprising: an organopolysiloxane with at least 2 silicon-bonded alkenyl groups per molecule, a silica powder, a curing agent, a hydrosilylation catalyst, and a dianine compound. The composition cures to a silicone cured product with excellent flame resistance.

DETAILED DESCRIPTION OF THE INVENTION

The curable silicone composition comprises:
(A) an organopolysiloxane with at least 2 silicon-bonded alkenyl groups per molecule,
(B) a silica powder with a specific surface area of not less than 50 sq. m/g,
(C) an organopolysiloxane curing agent having at least 2 silicon-bonded hydrogen atoms per molecule,
(D) a hydrosilylation catalyst, and
(E) a diamine compound.

Component (A) is an organopolysiloxane having at least two silicon-bonded alkenyl groups per molecule. Suitable alkenyl groups include vinyl, allyl, butenyl, pentenyl, and hexenyl groups. Vinyl groups are preferred.

Component (A) may also contain substituted and non-substituted monovalent hydrocarbon groups. Examples of suitable non-substituted monovalent hydrocarbon groups include alkyl such as methyl, ethyl, propyl, butyl, pentyl, and hexyl; cycloalkyl such as cyclopentyl and cyclohexyl; aryl such as phenyl, tolyl, and xylyl; and aralkyl such as benzyl and phenethyl. Examples of substituted monovalent hydrocarbon groups include halogenated alkyl groups such as 3,3,3-trifluoropropyl and 3-chloropropyl. Methyl and phenyl groups are preferred.

Component (A) can have a straight chain, a partially branched straight chain, or a branched chain molecular structure. However, straight chain and partially branched straight chain structures are preferred.

The viscosity of component (A) is not critical. However, the viscosity at 25° C. is preferably in the range of 50 to 100,000 mPa s. When the viscosity at 25 ° C. is less than 50 mPa s, the physical characteristics of the resultant silicone cured product might deteriorate. On the other hand, when viscosity exceeds 100,000 mPa s, the flowability and handling properties of the resultant composition may deteriorate.

Component (B) is a silica powder with a specific surface area of not less than 50 sq. m/g. The specific surface area is preferably not less than 100 sq. m/g, and more preferably, not less than 150 sq. m/g. A silica powder with a specific surface area below this range will not disperse uniformly and will not impart sufficient flame resistance to the resultant cured product.

Examples of suitable silica powders for component (B) include fumed silica, precipitation silica, or silicas surface-treated with hexamethyldisilazane, dimethyldichlorosilane, methyltrichlorosilane, and the like, to impart hydrophobicity.

The amount of silica powder in the composition is in the range of 0.01 to 15 parts by weight, preferably in the range of 0.01 to 10 parts by weight, and more preferably, in the range of from 0.01 to 5.0 parts by weight, per 100 parts by weight of component (A). If the amount of component (B) per 100 parts by weight of component (A) is below this range, the flame resistance of the resultant cured product tends to decrease. On the other hand, when the amount exceeds this range, the viscosity of the composition increases, its flowability and handling properties decrease, and its transparency tends to decrease.

Component (C) is an organopolysiloxane with at least two silicon-bonded hydrogen atoms per molecule. Component (C) may also contain substituted or non-substituted monovalent hydrocarbon groups. Examples of suitable non-substituted monovalent hydrocarbon groups include alkyl such as methyl, ethyl, propyl, butyl, pentyl, and hexyl; cycloalkyl such as cyclopentyl and cyclohexyl; aryl such as phenyl, tolyl, and xylyl; and aralkyl groups such as benzyl and phenethyl. Examples of suitable substituted monovalent hydrocarbon groups include halogenated alkyl groups such as 3,3,3-trifluoropropyl and 3-chloropropyl. Methyl and phenyl groups are preferred.

Component (C) can have a straight chain, a partially branched straight chain, or a branched chain molecular structure. However, straight chain and partially branched straight chain are preferred.

The viscosity of component (C) is preferably in the range of 1 mPa s to 100,000 mPa s at 25° C. If the viscosity of component (C) is less than 1 mPa s, the component could easily volatilize and render the composition unstable. On the other hand, when viscosity exceeds 100,000 mPa s, the flowability and handling properties of the resultant composition might deteriorate.

The amount of component (C) is 0.1 to about 5 mole of the silicon-bonded hydrogen atoms in component (C) per 1 mole of the silicon-bonded alkenyl groups in component (A). When there is less than 0.1 mole of silicon-bonded hydrogen atoms in component (C) per 1 mole of the silicon-bonded alkenyl groups in component (A), the composition is difficult to cure completely. On the other hand, the flame resistance becomes insufficient when the cured product is obtained from a composition in which the quantity of the silicon-bonded hydrogen atoms in component (C) per 1 mole of the silicon-bonded alkenyl groups in component (A) exceeds 5.

Component (D) is a hydrosilylation catalyst used to cure the composition. Suitable hydrosilylation catalysts include platinum catalysts such as chloroplatinic acid, alcohol solutions of chloroplatinic acid, olefin complexes of platinum, 1,3-divinyl-1,1,3,3-tetramethyldisiloxane complexes of platinum, and diketone complexes of platinum; palladium catalysts such as palladium black and tetrakis (triphenylphosphine) palladium; and rhodium catalysts. Platinum catalysts are preferable.

The amount of component (D) is a catalytic amount. When a platinum catalyst is used as component (D), the amount is preferably selected such that the content of platinum metal contained in the platinum catalyst is 0.01 to about 1,000 ppm based on the weight of component (A). The amount is more preferably in the range of 0.1 to 500 ppm. Compositions, in which the amount of platinum metal contained in the catalyst is below this range, tend become difficult to cure completely. On the other hand, when the amount of platinum metal exceeds this range, the cured products obtained from compositions can assume a brown color when heated.

Component (E) is a diamine compound represented by the general formula:

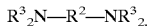

Each $R^3$ is independently selected from the group consisting of alkyl groups of 1 to about 4 carbon atoms and hydrogen atoms. Suitable alkyl groups are exemplified by methyl, ethyl, propyl, and butyl groups.

$R^2$ is an alkylene group with 2 to about 4 carbon atoms. Suitable alkylene groups are exemplified by ethylene, propylene, and butylene groups. Ethylene is preferred.

Component (E) is known in the art as an agent for improving the storage stability of curable silicone compositions cured by hydrosilylation reaction, however, component (E) could not impart flanae resistance to the cured product by itself. However, it has been found that component (E) could impart flame resistance to the cured product, when added together with component (B).

Suitable diamine compounds for component (E) include N,N,N',N'-tetramethylethylenediamine, N,N-dimethylethylenediamine, N,N-diethylethylenediamine, N,N-dibutylethylenediamine, and N,N,N',N'-tetraethylethylenediamine. N,N,N',N'-tetramethylethylenediamine is preferred.

The amount of component (E) in this composition ranges from 0.0001 to 1.0 parts by weight; preferably 0.0005 to 0.1 parts by weight; and more preferably 0.0005 to 0.01 parts by weight; per 100 parts by weight of component (A). When amount of component (E) per 100 parts by weight of component (A) is below this range, it becomes difficult to impart sufficient flame resistance to the resultant cured product. On the other hand, the curability of compositions, in which the amount exceeds this range, tends to decrease.

The weight ratio of component (E) to component (B) should be in the range of from 0.0005 to 0.05, preferably 0.0005 to 0.01. When the weight ratio of component (E) to component (B) is below this range, there is a tendency that the effect of increased flame resistance due to the addition of component (E) cannot be sufficiently displayed. On the other hand, when the ratio exceeds this range, it becomes impossible to impart sufficient flame resistance to the resultant cured product, and the curable silicone composition cannot be cured.

The curable silicone composition is prepared by mixing components (A), (B), (C), (D), and (E). The composition cures to a flame resistant cured silicone product. The silicone cured product obtained by curing the composition can be colorless and transparent or colorless and semi-transparent. Alternatively, colored transparent, or colored semi-transparent, silicone cured products possessing flame resistance can be formed by adding various optional dyes and fluorescent dyes to the composition. When the transparency of the resultant silicone cured product is not important, various optional pigments and inorganic fillers can be compounded therewith.

Furthermore, other optional additives may be used in this composition, as long as this does not negate the purpose of the present invention. For example, acetylene compounds, ene-yne compounds, hydrazine compounds, phosphine compounds, mercaptan compounds and other addition reaction suppressants can be used. Heat-resistant additives, inorganic flame resistance-imparting agents, plasticizers, and adhesive property-imparting agents can be added to the present composition.

Silicone gels, silicone rubbers, and silicone resins are suggested as examples of silicone cured products obtained by curing the curable silicone composition of the present invention. In a preferred embodiment of the invention, silicone gels obtained by curing the present composition possess a relatively good flame resistance. Preferably, the ¼ consistency, as specified in JIS K 2220, of these silicone gels should be in the range of from 20 to 200. When their ¼ consistency is less than 20, stress relaxation properties of the silicone gels deteriorate; and when the gels are used for sealing or filling electric or electronic parts, the gels are prone to crack. On the other hand, when ¼ consistency exceeds 200, the silicone gels are prone to become fluid on exposure to vibration.

The process for curing the curable silicone composition of this invention is not critical. For example, the composition can be cured by allowing the composition to stand at room temperature, or it can be heated to 50 to about 200° C.

Although the silicone cured product obtained in this manner can be handled as is, it is commonly handled by applying it to a substrate. For example, it is preferable to handle it in a state, in which it seals or fills electric or electronic parts, and it is especially preferable to handle it as sealant or filler for power modules and the like. Also, although the silicone cured product is colorless and transparent or semi-transparent, its color can be adjusted arbitrarily by adding pigments and dyes.

EXAMPLES

These examples are intended to illustrate the invention to those skilled in the art and should not be interpreted as limiting the scope of the invention set forth in the claims.

Viscosity in these examples is measured at 25° C. The ¼ consistency was measured as follows: A silicone cured product was formed by placing 40 g of the curable silicone composition in a 50 ml beaker and then heating it for 1 hour at 125° C. After cooling the silicone cured product to 25° C. measurements were performed using a ¼-inch cone in accordance with the method specified in JIS K 2220. The cone is positioned in a dropping device, perpendicular to the sample. The cone is dropped and allowed to penetrate the sample for 5 seconds, and penetration is measured.

Flame resistance of the cured product was measured as follows: Test samples, which were 12.7 mm wide, 127 mm long, and 3 mm thick, were prepared by placing the curable silicone composition in a Teflon® container and then heating it for 30 min to 1 hour at 120 to 125° C. A test sample was secured in a vertical position and the bottom portion of the test sample was placed in the center of a 20 mm flame (blue flame: 10 mm) of a gas burner, whose main ingredient was methane gas, for about 10 seconds, after which the gas burner was taken away and the time to extinction of the flame on the test sample was measured. Also, immediately after extinction of the flame on the test sample the above described operation was performed again, and the time to extinction of the flame (combustion time) was measured. This operation was repeated twice on each of the five test samples, obtaining a total combustion time based on ten measurements.

EXAMPLE 1

Three curable silicone gel compositions were prepared and cured. The components and amounts in each sample (expressed in parts by weight) are listed as Examples 1–3 in Table 1. The curable silicone gel compositions were prepared by uniformly mixing the components.

COMPONENT A-1 is an organopolysiloxane with a viscosity of 800 mPa s comprising 93.8 mol % $(CH_3)_2SiO_{2/2}$ units, 3.1 mol % $CH_3SiO_{3/2}$, 2.5 mol % $(CH_3)_3SiO_{1/2}$ units, and 0.6 mol % $(CH_3)_2(CH_2=CH)SiO_{1/2}$ units (vinyl content=0.22 wt %).

COMPONENT A-2 is a dimethylpolysiloxane with a viscosity of 2,000 mPa s having both terminal ends of the molecular chain blocked with dimethylvinylsiloxy groups (vinyl content=0.22 wt %).

COMPONENT B-1 is a fumed silica with a specific surface area of 200 sq. m/g surface treated with hexamethyldisilazane.

COMPONENT B-2 is a fumed silica with a specific surface area of 300 sq. m/g surface treated with dimethyldichlorosilane.

COMPONENT C is a dimethylpolysiloxane with a viscosity of 10 mPa s having both terminal ends of the molecular chain blocked with dimethylhydrogensiloxy groups (silicon-bonded hydrogen content=0.13 wt %).

COMPONENT D is a complex of 1,3-divinyl-1,1,3,3-tetramethyldisiloxane with platinum, in which the concentration of platinum was 0.5 wt %.

COMPONENT E-1 is N,N,N',N'-tetramethylethylenediamine.

Colorless transparent silicone gels were formed by curing these silicone gel compositions by heating them for 1 hour at 125° C. The ¼ consistency and flame resistance of the silicone gels was evaluated and the results were listed in Table 4. In addition, $SiH/SiCH=CH_2$ in Table 1 shows the molar number of the silicon-bonded hydrogen atoms contained in the organopolysiloxane used as component (C) per 1 mole of the silicon-bonded alkenyl groups contained in the organopolysiloxanes used as component (A-1) and (A-2). The weight ratio of (E-1)/(B) shows the weight ratio of the diamine compound to the silica powder.

Comparative Example 1

Four curable silicone gel compositions were prepared and cured as in Example 1. The components and amounts in each sample (expressed in parts by weight) are listed as Comparative Examples 4–7 in Table 2. The curable silicone gel compositions were prepared by uniformly mixing the components. All components are the same as defined in Example 1.

Colorless transparent silicone gels were formed by curing these silicone gel compositions as in Example 1. The ¼ consistency and flame resistance of the silicone gels was evaluated and the results were listed in Table 2.

Comparative Example 2

Three silicone gel compositions, labeled Comparative Examples 8–10, were prepared by uniformly mixing components with the composition (parts by weight) shown in Table 3. Components (A-1), (B-1), (C), and (D) are as defined in Example 1.

COMPONENT E-2 is N-methylaniline.

COMPONENT E-3 is Pyridine.

COMPONENT E-4 is N,N,N',N'-tetramethylhexamethylenediamine.

Colorless transparent silicone gels were formed by curing the silicone gel compositions by heating them for 1 hour at 125° C. The ¼ consistency and flame resistance of the silicone gels was evaluated and the results were listed in Table 3. In addition, SiH/SiCH═CH₂ in Table 3 shows the molar number of the silicon-bonded hydrogen atoms contained in the organopolysiloxane used as component (C) per 1 mole of the silicon-bonded alkenyl groups contained in the organopolysiloxane used as component (A-1).

TABLE 1

| | | Examples | | |
|---|---|---|---|---|
| | | | Examples | |
| Composition | | 1 | 2 | 3 |
| (parts by weight) | A-1 | 100 | 100 | 50 |
| | A-2 | 0 | 0 | 50 |
| | B-1 | 0.5 | 0 | 0 |
| | B-2 | 0 | 2 | 0.5 |
| | C | 6.5 | 8.0 | 6.4 |
| | D | 0.2 | 0.2 | 0.2 |
| | E-1 | 0.002 | 0.002 | 0.004 |
| SiH/SiCH═CH₂ | | 1.0 | 1.3 | 1.0 |
| (E)/(B) | | 0.004 | 0.001 | 0.008 |
| Viscosity mPa s | | 800 | 830 | 1200 |
| Appearance | | Colorless transparent | Colorless transparent | Colorless transparent |
| ¼ consistency | | 85 | 110 | 105 |
| Flame resistance (sec) | | 162 | 105 | 125 |

TABLE 2

Comparative Examples with and without Components (B) and (E)

| | | Comparative Examples | | | |
|---|---|---|---|---|---|
| Composition | | 4 | 5 | 6 | 7 |
| (parts by weight) | A-1 | 100 | 100 | 100 | 100 |
| | A-2 | 0 | 0 | 0 | 0 |
| | B-1 | 0 | 0.5 | 0 | 0 |
| | B-2 | 0 | 0 | 10 | 0.01 |
| | C | 6.5 | 6.3 | 6.4 | 6.5 |
| | D | 0.2 | 0.2 | 0.2 | 0.2 |
| | E-1 | 0.002 | 0 | 0.002 | 0.001 |
| SiH/SiCH═CH₂ | | 1.0 | 1.0 | 1.0 | 1.0 |
| (E)/(B) | | — | 0 | 0.0002 | 0.1 |
| Viscosity mPa s | | 780 | 800 | 2000 | 790 |
| Appearance | | Colorless transparent | Colorless transparent | Colorless transparent | Colorless transparent |
| ¼ consistency | | 95 | 94 | 65 | 85 |
| Flame resistance (sec) | | 340 | 450 | 342 | 595 |

TABLE 3

Comparative Examples with Different Diamine Compounds

| | | Comparative Examples | | |
|---|---|---|---|---|
| Composition | | 8 | 9 | 10 |
| (parts by weight) | A-1 | 100 | 100 | 100 |
| | B-1 | 0.5 | 0.5 | 0.5 |
| | C | 6.3 | 6.3 | 6.3 |
| | D | 0.2 | 0.2 | 0.2 |
| | E-2 | 0.002 | 0 | 0 |
| | E-3 | 0 | 0.002 | 0 |
| | E-4 | 0 | 0 | 0.002 |
| SiH/SiCH═CH₂ | | 1.0 | 1.0 | 1.0 |
| Viscosity (mPa s) | | 800 | 800 | 800 |
| Appearance | | Colorless, transparent | Colorless, transparent | Colorless, transparent |
| ¼ consistency | | 93 | 93 | 91 |
| Flame resistance (seconds) | | 540 | 605 | 755 |

We claim:

1. A curable silicone composition comprising:
   (A) 100 parts by weight of an organopolysiloxane having at least two silicon-bonded alkenyl groups per molecule,
   (B) 0.01 to 15 parts by weight of a silica powder with a specific surface area of not less than 50 sq. m/g,
   (C) an organopolysiloxane having at least two silicon-bonded hydrogen atoms per molecule in an amount such that the quantity of the silicon-bonded hydrogen atoms in component (B) is 0.1 to 5 moles, per 1 mole of silicon-bonded alkenyl groups in component (A);
   (D) an amount of a hydrosilylation catalyst such that the content of platinum metal contained in the catalyst is 0.01 to about 1,000 ppm based on the weight of component (A), and
   (E) 0.0001 to 1.0 parts by weight of a diamine compound with a general formula:

$$R^3{}_2N-R^2-NR^3{}_2$$

wherein each $R^3$ is independently selected from the group consisting of alkyl groups of 1 ino about 4 carbon atoms and hydrogen atoms, $R^2$ is an alkylene group of 2 to about 4 carbon atoms, and
   wherein component (E) is added in an amount such that the parts by weight of component (E) is 0.0005 to 0.05, per part by weight of component (B).

2. The composition of claim 1, wherein component (B) is a silica powder selected from the group consisting of fumed silica, precipitation silica, and silicas with surface treatments.

3. The composition of claim 2, wherein component (B) is a silica powder with a surface treatment selected from the group consisting of hexamethyldisilazane, dimethyldichlorosilane, and methyltrichlorosilane.

4. The composition of claim 2, wherein component (B) is fumed silica treated with hexamethyldisilazane, and it is present at 0.01 to 10 parts by weight per 100 parts by weight of component (A).

5. The composition of claim 1, wherein $R^2$ on component (E) represents an ethylene group and component (E) is present at 0.0005 to 0.1 parts by weight per 100 parts of component (A).

6. The composition of claim 5, wherein component (E) is selected from the group consisting of N,N,N',N'-tcetramethylethylenediamine, N,N-dimethylethylenediamine, N,N-diethylethylenediamine, N,N-dibutylethylenediamine, and N,N,N',N'-tetraethylethylenediamine.

7. The composition of claim 6, wherein component (E) is N,N,N',N'-tetramethylethylenediamine and it is present in an amount ranging from 0.0005 to 0.01 parts by weight per 100 parts by weight of component (A).

8. The composition of claim 1, wherein component (E) is added in an amount such that the parts by weight of component (E) is 0.0005 to 0.01, per part by weight of component (B).

9. The composition of claim 1, further comprising an addition reaction suppressant selected from the group consisting of acetylene compounds, ene-yne compounds, hydrazine compounds, phosphine compounds, and mercaptan compounds.

10. A method for preparing a curable silicone composition comprising mixing a composition comprising:
    (A) 100 parts by weight of an organopolysiloxane having at least two silicon-bonded alkenyl groups per molecule, (B) 0.01 to 15 parts by weight of a silica powder with a specific surface area of not less than 50 sq. m/g, (C) an organopolysiloxane having at least two silicon-bonded hydrogen atoms per molecule in an amount such that the quantity of the silicon-bonded hydrogen atoms in component (B) is 0.1 to 5 moles, per 1 mole of silicon-bonded alkenyl groups in component (A);

(D) an amount of a hydrosilylation catalyst such that the content of platinum metal contained in the catalyst is 0.01 to about 1,000 ppm based on the weight of component (A), and (E) 0.0001 to 1.0 parts by weight of a diamine compound with a general formula:

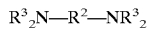

wherein each $R^3$ is independently selected from the group consisting of alkyl groups of 1 to about 4 carbon atoms and hydrogen atoms, $R^2$ is an alkylene group of 2 to about 4 carbon atoms, and wherein component (E) is added in an amount such that the weight parts of component (E) is 0.0005 to 0.05, per weight part of component (B).

11. The method of claim 10, wherein component (E) is added together with component (B).

12. The method of claim 10, further comprising curing the composition.

13. The method of claim 10, wherein curing is carried out by heating to a temperature of 50 to about 200° C.

14. A silicone cured product prepared by the method of claim 12.

* * * * *